(12) United States Patent
Popov

(10) Patent No.: US 10,154,246 B2
(45) Date of Patent: Dec. 11, 2018

(54) SYSTEMS AND METHODS FOR 3D CAPTURING OF OBJECTS AND MOTION SEQUENCES USING MULTIPLE RANGE AND RGB CAMERAS

(71) Applicant: Cappasity Inc., Houston, TX (US)

(72) Inventor: Konstantin Popov, Houston, TX (US)

(73) Assignee: Cappasity Inc., Houston, TX (US)

( * ) Notice: Subject to any disclaimer, the term of this patent is extended or adjusted under 35 U.S.C. 154(b) by 0 days.

(21) Appl. No.: 14/946,133

(22) Filed: Nov. 19, 2015

(65) Prior Publication Data

US 2016/0150217 A1 May 26, 2016

Related U.S. Application Data

(60) Provisional application No. 62/082,152, filed on Nov. 20, 2014.

(51) Int. Cl.
*H04N 13/00* (2018.01)
*H04N 13/239* (2018.01)
*H04N 13/243* (2018.01)
*H04N 13/246* (2018.01)
*H04N 13/257* (2018.01)
*G06T 15/04* (2011.01)
*G06T 17/00* (2006.01)
*H04N 13/271* (2018.01)

(52) U.S. Cl.
CPC ........... *H04N 13/239* (2018.05); *G06T 15/04* (2013.01); *G06T 17/00* (2013.01); *H04N 13/243* (2018.05); *H04N 13/246* (2018.05); *H04N 13/257* (2018.05); *H04N 13/271* (2018.05); *G06T 2200/04* (2013.01); *G06T 2207/10028* (2013.01)

(58) Field of Classification Search
CPC .......... H04N 13/0275; H04N 13/0278; H04N 13/0282
USPC ...... 348/207.99, E13.002, E13.006, E13.015
See application file for complete search history.

(56) References Cited

U.S. PATENT DOCUMENTS

| 6,442,419 | B1 | 8/2002 | Chu et al. | |
| 8,217,931 | B2* | 7/2012 | Lowe | G06T 15/20 345/418 |
| 8,837,026 | B2 | 9/2014 | Fisker et al. | |
| 9,332,222 | B2* | 5/2016 | Smith | H04N 7/15 |
| 9,697,647 | B2* | 7/2017 | Kamat | G06T 19/006 |

(Continued)

FOREIGN PATENT DOCUMENTS

WO 98/05157 2/1998

OTHER PUBLICATIONS

Popov, Konstantin. "3D People Full-Body Scanning System With Intel® RealSense™ 3D Cameras and Intel® Edison: How We Did It" Oct. 15, 2015. Web. Nov. 17, 2015. <https://software.intel.com/en-us/articles/cappasity-3d-people-full-body-scan-with-intel-realsense-and-intel-Edison>.

(Continued)

*Primary Examiner* — Anthony J Daniels
(74) *Attorney, Agent, or Firm* — DLA Piper LLP (US)

(57) ABSTRACT

A system and method for electronic modeling of physical objects in a three-dimensional (3D) representation is described. The system generally comprises a plurality of range and RGB cameras which are controlled to provide images of different portions of a 3D person or object. The method operates by taking the separate images produced by the plurality of range and RGB cameras, and combining them into a 3D representation.

16 Claims, 10 Drawing Sheets

(56) References Cited

U.S. PATENT DOCUMENTS

| | | | |
|---|---|---|---|
| 2002/0190991 A1* | 12/2002 | Efran | H04N 5/2224 345/475 |
| 2003/0160970 A1 | 8/2003 | Basu et al. | |
| 2010/0238273 A1 | 9/2010 | Luisi et al. | |
| 2011/0300929 A1 | 12/2011 | Tardiff et al. | |
| 2011/0310376 A1* | 12/2011 | Shim | G01S 7/497 356/4.07 |
| 2013/0092920 A1 | 4/2013 | Kim et al. | |
| 2013/0095920 A1* | 4/2013 | Patiejunas | G06T 15/00 463/31 |
| 2013/0321589 A1* | 12/2013 | Kirk | G06T 15/04 348/48 |
| 2014/0098183 A1 | 4/2014 | Smith et al. | |
| 2014/0118500 A1* | 5/2014 | Liu | H04N 13/0203 348/46 |
| 2014/0192164 A1 | 7/2014 | Tenn et al. | |
| 2014/0212832 A1 | 7/2014 | Fisker et al. | |
| 2014/0236335 A1 | 8/2014 | Lewis et al. | |
| 2014/0340404 A1* | 11/2014 | Wang | G06T 15/20 345/427 |
| 2015/0332464 A1* | 11/2015 | O'Keefe | G06T 7/0038 348/47 |
| 2015/0381968 A1* | 12/2015 | Arora | G06T 17/00 348/47 |

OTHER PUBLICATIONS

Vedernikov, Alexey. "Making 3D modelling simple, fast and affordable with RealSense" Web. Nov. 17, 2015. <https://iq.intel.co.uk/making-3d-modelling-simple-fast-and-affordable-with-realsense/>.

Gal, Ran, et al. "Seamless Montage for Texturing Models." Computer Graphics Forum, Tel-Aviv University (1981): vol. 0. pp. 1-7.

International Preliminary Report on Patentability and Written Opinion dated Feb. 18, 2016 in corresponding PCT Application No. PCT/US2015/061577.

* cited by examiner

SYSTEMS AND METHODS FOR 3D CAPTURING OF OBJECTS AND MOTION SEQUENCES USING MULTIPLE RANGE AND RGB CAMERAS

CROSS REFERENCE TO RELATED APPLICATIONS

This application claims priority to U.S. Provisional Patent Application No. 62/082,152, filed Nov. 20, 2014, the entire contents of which are incorporated by reference, as if fully set forth herein.

FIELD OF THE INVENTION

The present invention relates generally to systems and methods for the electronic modeling of physical objects in a three-dimensional (3D) representation, also known as 3D imaging.

BACKGROUND OF THE INVENTION

Digital electronics have made it possible to record a grey scale or color image of a scene, as a still image, as a series of still images, or as a video. A video is a series of still images that continues for an extended period of time with a specific interval between each image. Analog imaging utilizes photographic film to obtain an image, whereas digital imaging utilizes a focal plane array (FPA) to obtain an image which provides a signal in response to light illumination that is then digitized. The FPA includes an array of light-detecting elements, or pixels, positioned at a focal plane of optics that image a scene. FPAs are limited to collecting information about light emanating from a scene in two dimensions, horizontal (x) and vertical (y), in front of the imaging device, often referred to as the field-of-view (FOV). Most FPAs cannot, by themselves, obtain information about the distance (z) of an object from the FPA without the use of complex, high speed, expensive read-out circuits. A wide variety of imaging techniques have been developed to attempt to extract, from a two-dimensional image, information about the distance of a scene and of three-dimensional objects within that scene.

One approach to obtaining distance information for objects in a scene is based on scanning a laser beam over the scene, and determining the ranges and three-dimensional shapes of objects in a scene based on a phase or temporal delay of the laser beam, following reflection from the object. Some such laser scanners are limited to processing tens of thousands to hundreds of thousands of points per second. Therefore, obtaining a high resolution image of a complex scene may take a large amount of time. Additionally, laser scanning merely provides the value of the distance at each measurement point, resulting in what may be referred to as a "point cloud"; often no color or intensity information is obtained, and additional steps are required to transform the point cloud into a digital representation more suited to human interpretation.

The recent emergence of high quality digital imaging through the use of digital cameras and the like has produced additional avenues for creating 3D representations of objects and scenes. Multi-view reconstruction is a process by which a plurality of two-dimensional images of one or more objects are combined to create a single 3D data representation of the objects. Multi-view reconstruction is typically achieved using a "point cloud" model derived from data that are extracted from two-dimensional images and allocated to a three-dimensional virtual space. The computational challenge to build a point-cloud has been solved many times. However, known solutions have several drawbacks.

For one, most conventional 3D scanning systems that use multi-view reconstruction are very expensive. Conventional multi-view 3D scanning systems are also difficult to set up and often require specialized technical expertise to operate. Additionally, the cameras and other hardware used in these system are often prohibitively expensive for the ordinary consumer. Add to that, these complex cameras take many hours to calibrate, and calibrations often require specialized expertise. Thus, conventional multi-view 3D scanning systems do not permit the ordinary consumer to perform 3D imaging easily and inexpensively.

The 3D scanning market is predicted to reach $4.08 billion in sales by 2018. The emergence of 3D printing technologies have made the ability to scan 3D objects of paramount importance.

Accordingly, there is presently a need for a system and method for 3D imaging which is affordable for the ordinary consumer, and also easy to set up and use.

SUMMARY OF THE INVENTION

An exemplary embodiment of the present invention comprises a computer system including at least one server computer and at least one client computer coupled to the at least one server computer through a network, a plurality of range cameras, each coupled to the at least one client computer, wherein the at least one server computer includes at least one program stored thereon, said at least one program being capable of performing the steps of capturing a first set of two-dimensional (2D) images of a three-dimensional (3D) scene or object using the plurality of range cameras, generating a point cloud from the first set of 2D images, and generating a 3D reconstruction of the 3D object using the first set of 2D images.

An exemplary embodiment of the present invention also comprises a non-transitory computer readable medium having embodied therein a computer program for processing by a machine, the computer program including a first code segment for capturing a first set of two-dimensional (2D) images of a three-dimensional (3D) object using the plurality of range cameras, a second code segment for generating a point cloud from the first set of 2D images, and a third code segment for generating a 3D reconstruction of the 3D object using the first set of 2D images.

An exemplary embodiment of the present invention also comprises a system for three-dimensional (3D) reconstruction of an object or scene, the system including a plurality of range cameras for imaging the object or scene, a plurality of RGB cameras for imaging the object or scene, and a controller comprising a first program module for generating at least one first image set from the plurality of range cameras, a second program module for generating at least one second image set from the plurality of RGB cameras, a third program module for generating a point cloud from the at least one first image set, a fourth program module for generating a 3D mesh reconstruction of the scene or object from the point cloud, and a fifth program module for performing texture mapping of the mesh reconstruction, wherein the plurality of range cameras and plurality of RGB cameras are disposed at different positions with respect to the object or scene, such that each range or RGB camera captures a different perspective of the object or scene and wherein such different perspectives are combined when generating the point cloud so as to completely reconstruct the 3D scene or object.

An exemplary embodiment of the present invention also comprises a computer-implemented method for three-dimensional (3D) reconstruction of an object or scene, the method including the steps of imaging the object or scene with a plurality of range cameras and producing at least one first image set, generating a point cloud using the at least one first image set, generating a 3D reconstruction of the object or scene using the point cloud, and displaying said 3D reconstruction of the object or scene.

BRIEF DESCRIPTION OF THE DRAWINGS

The invention will be better understood with reference to the following detailed description, of which the following drawings form an integral part.

DETAILED DESCRIPTION

Background

The system and method of the present invention includes at least three solutions for 3D imaging. A first solution involves scanning and capturing static images of a 3D object with multiple cameras. A second solution involves scanning and capturing static images of a 3D object with a single 3D camera (e.g., Intel® RealSense™ 3D Camera). A third solution involves scanning and capturing moving images of one or more 3D objects using either a single 3D camera, or with multiple 3D or standard cameras. The first solution is good fit for professional business purposes, when a person or entity needs to capture a large number of 3D objects, or scanning speed is a matter of priority. The second solution is a good fit for business or non-business users who have invested in a 3D camera; it provides a simple and affordable method for scanning and printing 3D objects. The third solution is ideal for applications where 3D motion capture is essential (e.g., video games, virtual reality, etc.).

Description of Specific Exemplary Embodiments

In a first exemplary embodiment, the present invention allows a user to utilize multiple range and Red/Green/Blue (RGB) cameras for instant capturing of a 360-degree 3D model.

Figure 1:
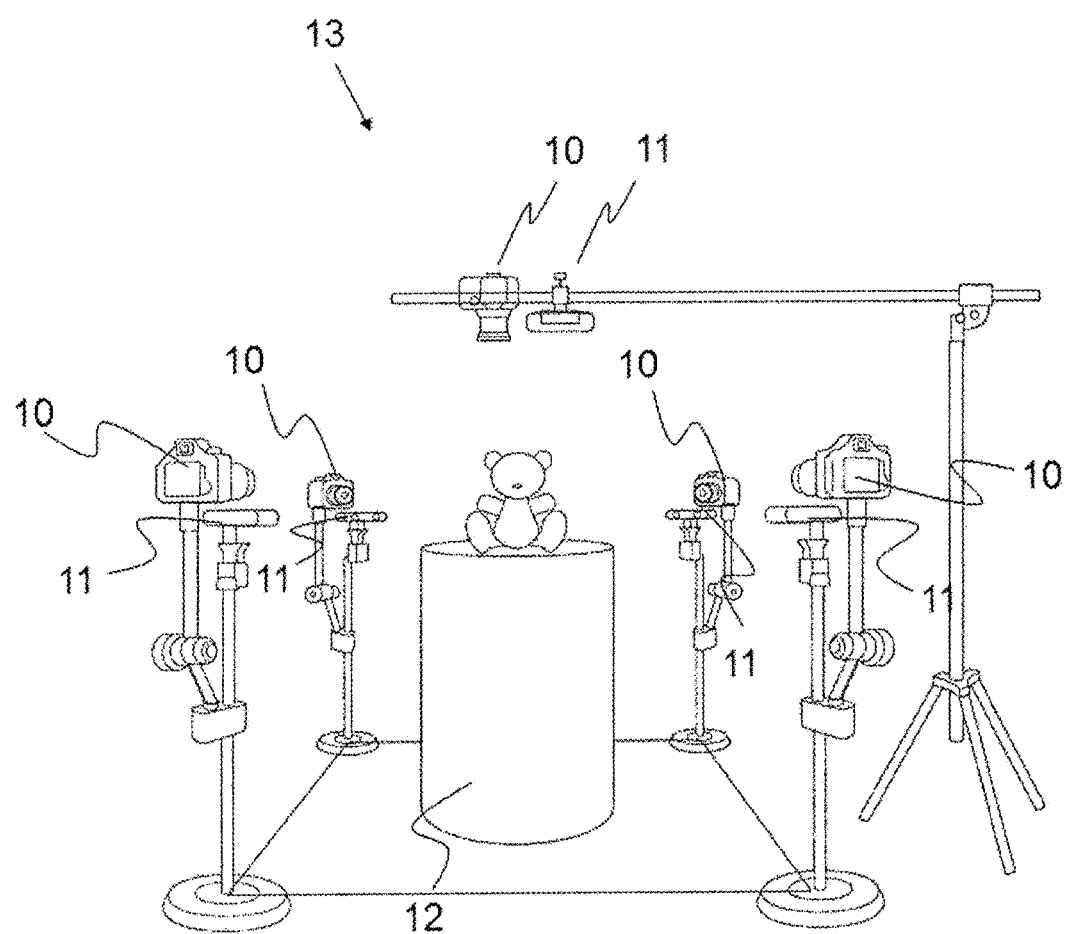
FIG. 1 is a perspective view of a 3D capture system according to a first exemplary embodiment of the present invention.

FIG. 1 is a perspective view of a 3D capture system 13 according to a first exemplary embodiment of the present invention. The system 13 uses data from range cameras 11 and RGB cameras 10 to generate a 360-degree 3D model of a 3D scene 12. The range cameras 11 produce range images, which are two-dimensional (2D) images showing the distance to points in a 3D scene 12 from a specific reference point. For example, range cameras 11 may comprise Microsoft® Kinect® 2 cameras or Apple® PrimeSense® cameras, and the RGB cameras may comprise standard digital cameras such as the Canon® Rebel®. The range cameras 11 and RGB cameras 10 are preferably connected to one or more computing devices (e.g., desktop computers, laptop computers, tablet computers, smartphones, etc.) which are not shown in FIG. 1. Together with the computing devices, the range cameras 11 and RGB cameras 10 form a network for capturing images simultaneously. The range cameras 11 and RGB cameras 10 may be coupled to the one or more computing devices through cables such as Universal Serial Bus (USB) cables, Thunderbolt™ cables, High Definition Multimedia Interface (HDMI) cables, or other cables for transmitting images and video known to those of ordinary skill in the art. In one exemplary embodiment, the range cameras 11 and RGB cameras 10 may be coupled to a single laptop computer using USB cables. In such an exemplary case, the laptop computer would preferably be running software for performing image capture. Such software will be explained in further detail below.

Alternatively, to a single laptop setup, those of ordinary skill in the art will realize that various setups are possible. As another example, each of the range cameras 11 and RGB cameras 10 may be coupled to a minicomputer (e.g., Intel® NUC) via USB cable or otherwise, where each minicomputer operates as a 'client' computer in a client-server model. Then a single server computer (e.g., Intel® Ultrabook®) with HD Graphics) may run the software for 3D imaging. In such a case, the server computer would send a recording command to the minicomputers connected to the cameras, obtain data from them, analyze the data, and builds the 3D model.

The term "computing device" as used herein is intended for all purposes to be interpreted broadly and is defined for all uses, all devices, and/or all systems and/or systems in this disclosure as a device comprising at least a central processing unit, a communications device for interfacing with a data network, transitory computer-readable memory, and/or a non-transitory computer-readable memory and/or media. The central processing unit carries out the instructions of one or more computer programs stored in the non-transitory computer-readable memory and/or media by performing arithmetical, logical, and input/output operations to accomplish in whole or in part one or more steps of any method described herein. A computing device is usable by one or more users, other computing devices directly and/or indirectly, actively and/or passively for one or more suitable functions herein. The computing device may be embodied as computer, a laptop, a tablet computer, a smartphone, and/or any other suitable device and may also be a networked computing device, a server, or the like. Where beneficial, a computing device preferably includes one or more human input devices such as a computer mouse and/or keyboard and one or more human interaction device such as one or more monitors. A computing device may refer to any input, output, and/or calculating device associated with providing a virtual reality experience to one or more users. Although one computing device may be shown and/or described, multiple computing devices may be used. Conversely, where multiple computing devices are shown and/or described, a single computing device may be used.

The one or more computing devices preferably have access to at least one program module (explained in detail below) that allows the computing device to communicate with the range cameras 11 and RGB cameras 10, and perform various functions. The primary function of the program module is 3D image capturing, the method for which being explained further below. The program module may include program code, written in Hypertext Mark-up Language (HTML), JAVA™ (Sun Microsystems, Inc.), Active Server Pages (ASP), Extensible Markup Language (XML), or any other suitable program language, which permits the computing devices to record and process data captured by the range cameras 11 and RGB cameras 10. For example, the program module may be stored on a remote server computer, such that the one or more computing device can access the program module through browsers (i.e., by entering a proper Uniform Resource Locator (URL) address), or through stand-alone applications running on the devices (e.g., Application programs ('Apps') running on Apple iPhone, Blackberry Phone, or Android Phone). Alternatively, the program module may be directly loaded into the memory of the one or more computing devices, and accessed without the need to make a call to a remote server. As in the example above, the program module may be part of a software program running on a computing device such as a laptop computer.

Figure 4:
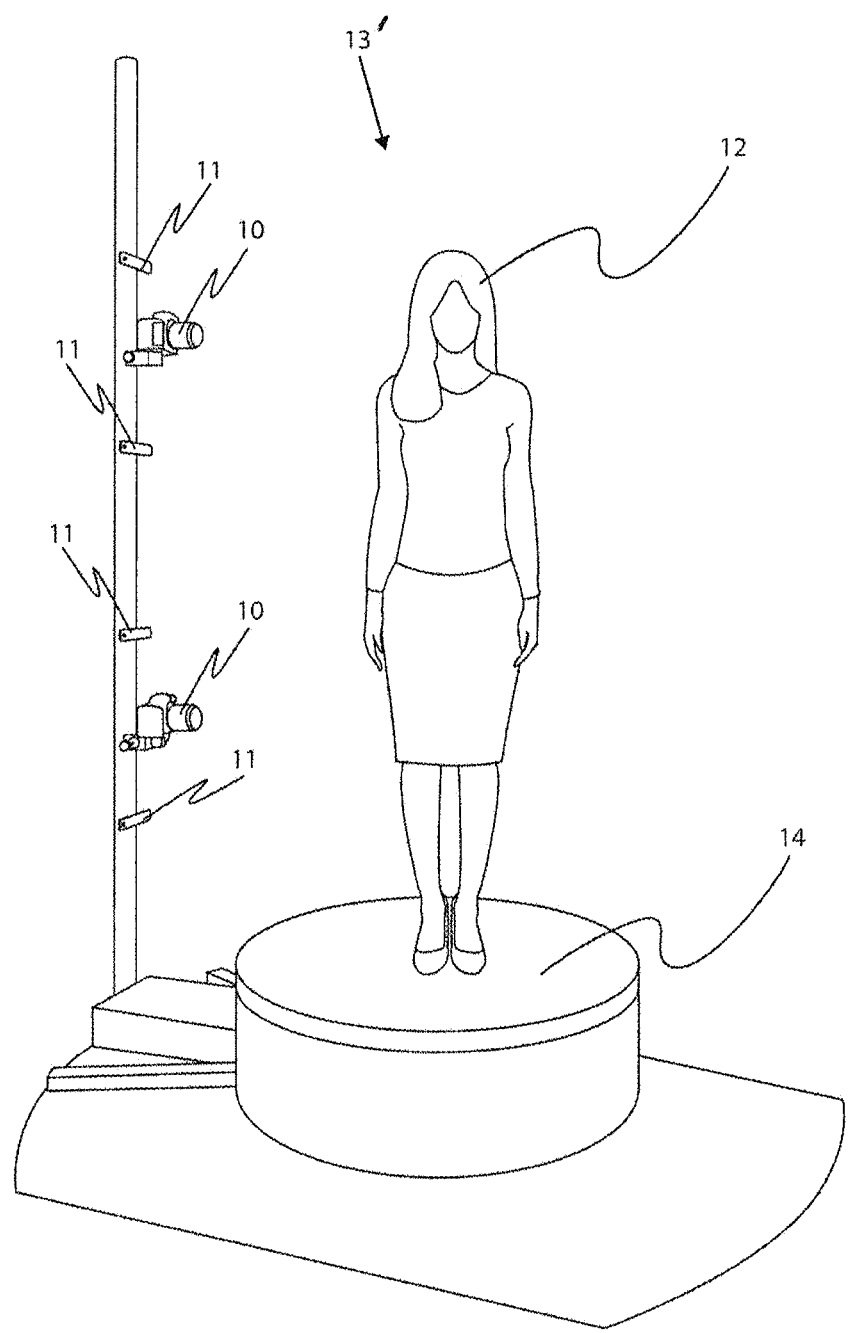
FIG. 4 is a perspective view of a 3D capture system according to a second exemplary embodiment of the present invention.
Figure 5:
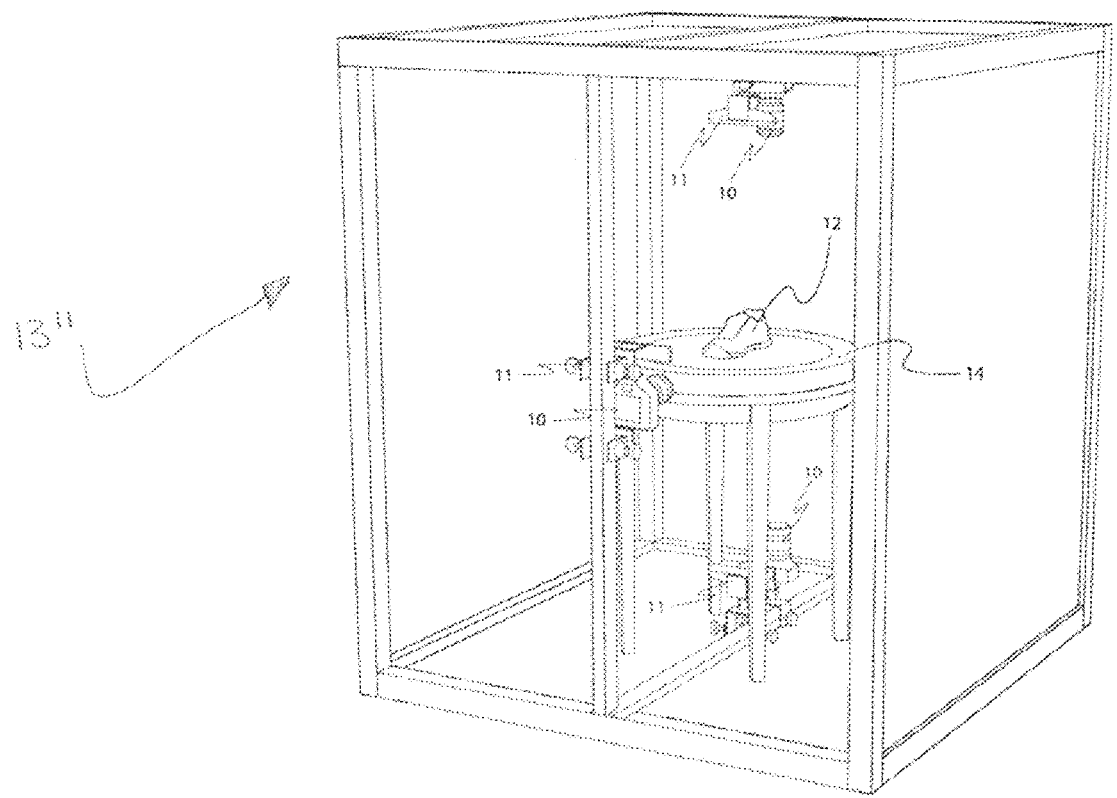
FIG. 5 is a perspective view of a 3D capture system according to a third exemplary embodiment of the present invention.

FIGS. 4 and 5 show alternative 3D capture systems 13', 13". These systems include many of the same elements as the 3D capture system 13 described with reference to FIG. 1, but have different numbers of cameras in different configurations. In FIG. 4, for example, the 3D capture system 13' includes two RGB cameras 10, and three range cameras 11 arranged along a single instrument which is disposed beside the object/scene 12. In FIG. 4, the 3D capture systems 13' is designed for a human subject and additionally includes a platform 14. In the 3D capture system 13" of FIG. 5, the system includes three RGB cameras 10, and three range cameras 11, arranged above, below and to the side of an object/scene 12. The 3D capture system 13" also includes a platform 14. The platform 14 preferably rotates, which allows an object/scene 12 to be easily scanned using on a small number of cameras.

The method for instant 3D capturing has two phases: (1) a calibration phase, and (2) a 3D capturing and reconstruction phase. The program module running on the computing device (e.g., laptop) carries out the method. The calibration phase insures that each of the range cameras 11 and RGB cameras 10 knows the relative position of the other range cameras 11 and RGB cameras 10. This is essential for 3D image reconstruction because each of the range cameras 11 and RGB cameras 10 are shooting a different aspect (or piece) of the object/scene 12. If the range cameras 11 and RGB cameras 10 are not calibrated to work in unison, reconstruction of a complete and accurate 3D image may not be possible.

Calibration Phase

As noted above, the 3D capture system 13 includes a set of cameras disposed at various angles with respect to a 3D object/scene 12. It is important that range cameras 11 and RGB cameras 10 capture all sides of the object/scene 12. There is no limit to the number of range cameras 11 and RGB cameras 10 that may be used with the 3D capture system 13.

Figure 2:
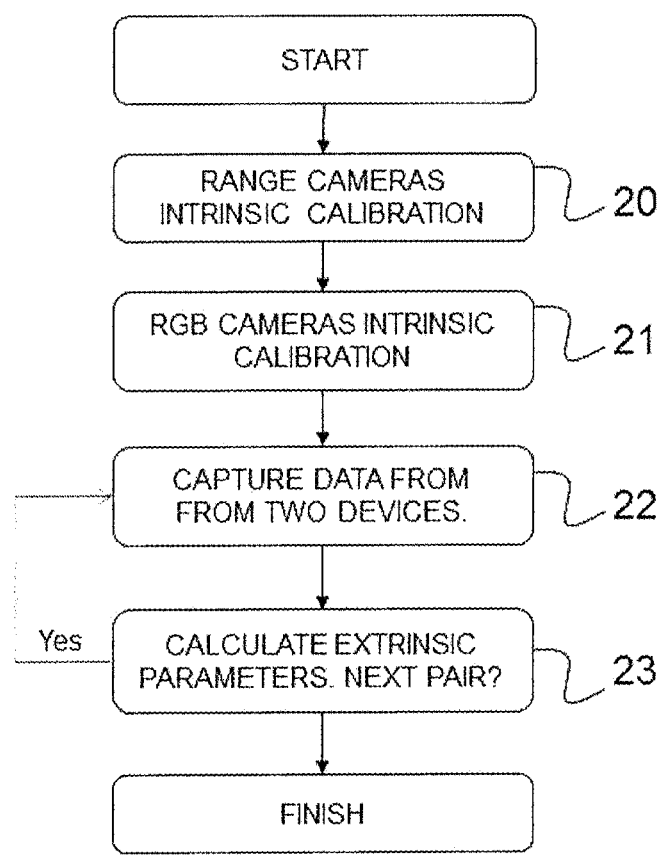
FIG. 2 is a flow diagram showing a calibration phase for the 3D capture system.
Figure 8:
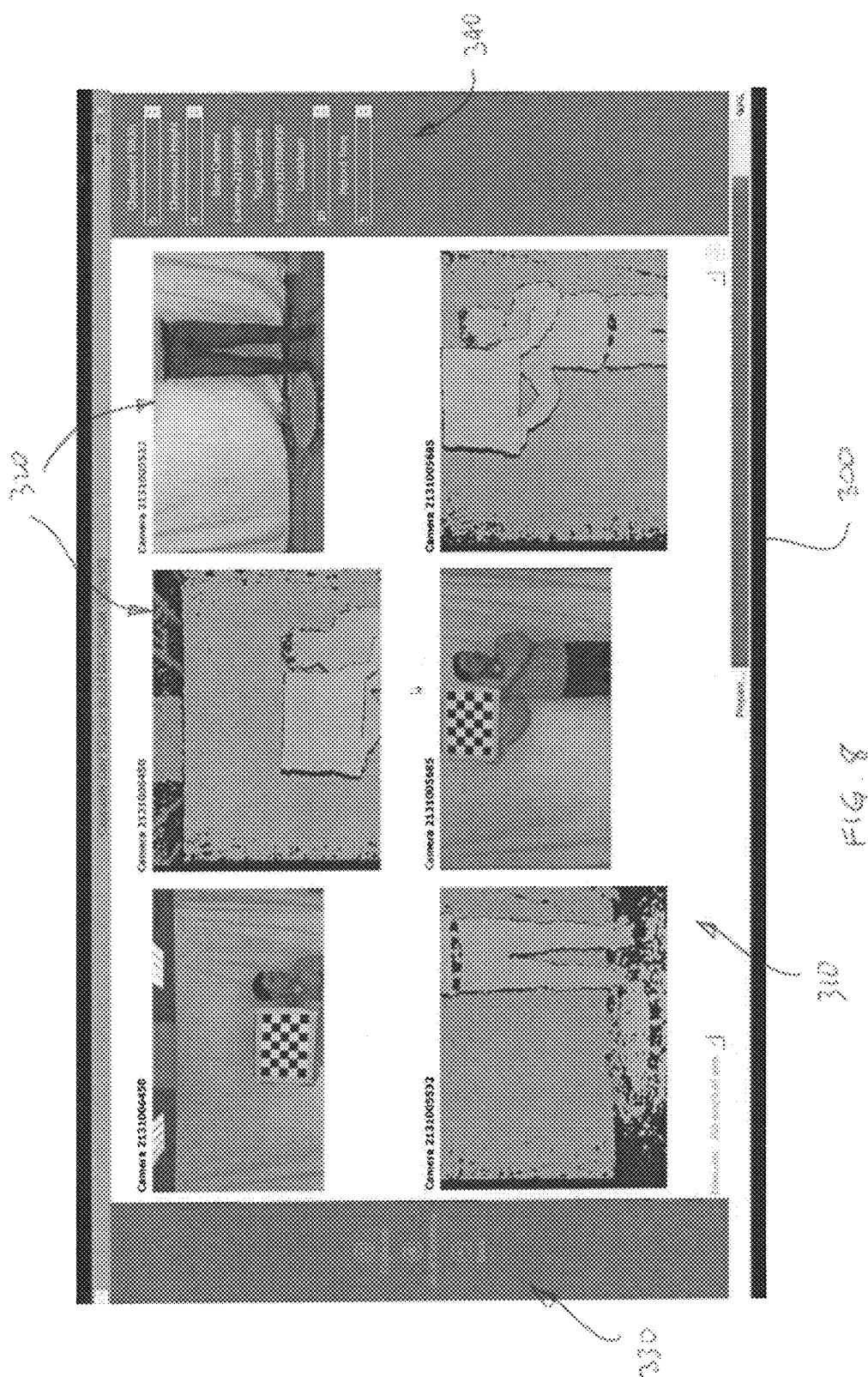
FIG. 8 illustrates an exemplary Calibration Screen according to an exemplary embodiment of the present invention.

FIG. 2 is a flow diagram showing the details of the calibration phase. In a first step 20, the range cameras 11 are calibrated so as to calculate the depth distortion for each range camera. Depth distortion is calculated by imaging a calibration device using the range cameras 11. In one exemplary embodiment, this calibration device is a mock 'chessboard' as shown in FIG. 8 discussed below. Those of ordinary skill in the art will realize that various objects may be used to perform the depth distortion measurement. Depth distortion is measured as a difference or disparity in depth from an actual value. To fix this distortion, the calibration device is imaged, and adjustments are made to the range value of the range cameras 11. This process may also be referred to as an intrinsic calibration of the range cameras 11.

Next, in step 21, the RGB cameras 10 are calibrated so as to determine several distortion parameters. The calibration device may also be used for this step, as black and white images are ideal to determine the distortion parameters for the RGB cameras 10. This is why a chessboard is an ideal device for calibration. In general RGB cameras exhibit radial distortions that may be classified as barrel distortions, pincushion distortions or mustache distortions. In photography, distortion is particularly associated with zoom lenses, particularly large-range zooms, but may also be found in prime lenses, and depends on focal distance. Barrel distortion may be found in wide-angle lenses, and is often seen at the wide-angle end of zoom lenses, while pincushion distortion is often seen in older or low-end telephoto lenses. Mustache distortion is observed particularly on the wide end of some zooms, with certain retrofocus lenses, and more recently on large-range zoom lenses. These distortions must be identified and accounted for in each RGB camera used for 3D imaging. The distortions are identified by imaging the calibration device with the RGB cameras 10, and making adjustments to the RGB cameras in response. Those of ordinary skill in the art will know the details of the distortion calibration process. This process may also be referred to as an intrinsic calibration of the RGB cameras 10.

After the intrinsic calibrations are completed, an extrinsic calibration follows. At step 22, data is captured from a first pair of cameras. Cameras may be paired according to type (RGB/RGB) or according to location in the scanning system (RGB/Range). In order to obtain the specific location of the RGB cameras 10, such cameras should be calibrated with any range cameras 11, and all range cameras should be calibrated relative to each other. Once the data capture from the first pair of cameras is complete, the process proceeds to a next (second) pair of cameras, and proceeds accordingly until data has been captured from all of the cameras. Once this extrinsic calibration is complete, the exact coordinates of the 3D object/scene 12 are known.

3D Capturing and Reconstruction Phase

Figure 3:
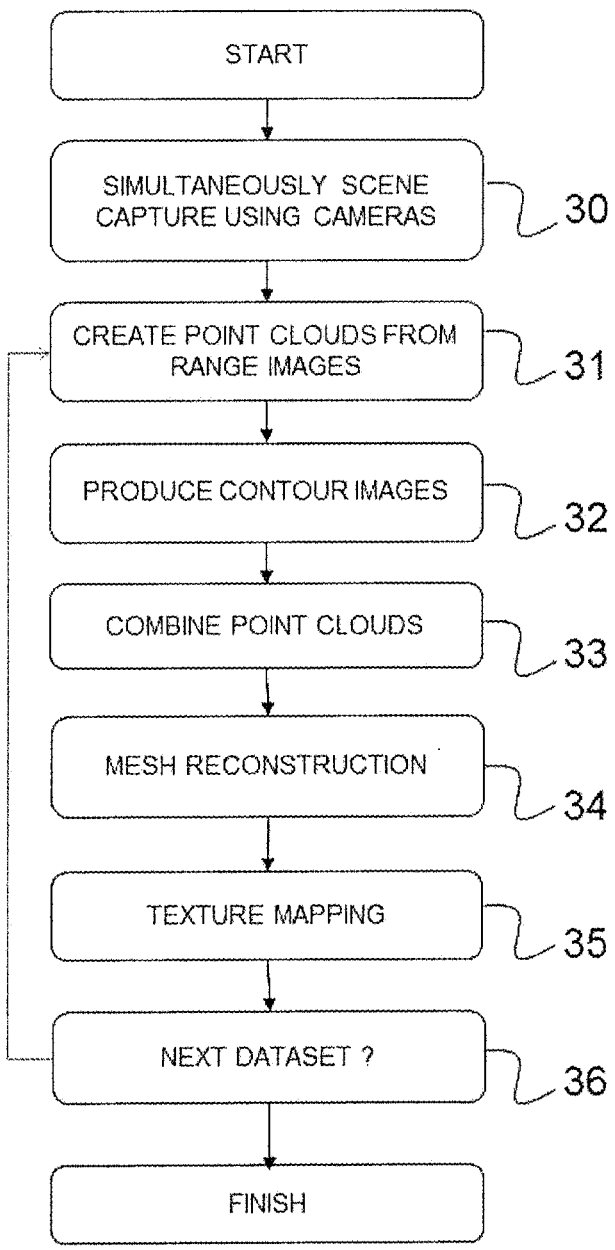
FIG. 3 is a flow diagram showing a capturing and reconstruction phase for the 3D capture system.

FIG. 3 is a is a flow diagram showing the details of the capturing and reconstruction phase. During the 3D capturing process all range cameras 11 and RGB cameras 10 are working simultaneously. As a result, a number of range and 2D color images are generated. This simultaneous capture is shown as step 30 of the method in FIG. 3. A process is performed on each set of range and 2D color images that are captured. First, in step 31, point clouds are created from the range camera images captured at step 30. As is known to those of ordinary skill in the art, a point cloud is a set of data points in some coordinate system. In 3D imaging, a point cloud is defined by X, Y, and Z coordinates, and is intended to represent the external surface of a 3D object/scene. Point clouds themselves are generally not directly usable in most 3D applications, and therefore are usually converted to polygon mesh or triangle mesh models, or CAD models, through a process commonly referred to as surface reconstruction. There are many techniques for converting a point cloud to a 3D surface model, and such techniques are known to those of ordinary skill in the art.

In certain exemplary embodiments of the present invention, background images may be removed from the 3D object/scene during the formation of the point cloud. This is accomplished by designating a scanning area of a particular size and shape. For example, geometric shapes, such as a cube or a cylinder, may be used. The size and shape of the scanning area are chosen to be slightly larger than the 3D object/scene being scanned, so that everything falling outside the scanning area is automatically excluded from the 3D scan. Then, the algorithm for forming the point cloud identifies any artifacts falling within the scanning area, but not logically connected to the 3D object/scene being scanned, and removes such artifacts from the point cloud.

Because each of the range cameras 11 and RGB cameras 10 are aimed at a different side of the scene/object 12, the individual point clouds generated by each range camera 11 must be combined to generate a point cloud of the entire scene/object. In the example shown in the FIG. 1, one of the range cameras 11 is aimed at a front left side of the scene/object 12 (i.e., a teddy bear), one is aimed at a front right side, one is aimed at a rear left side, and one is aimed at a rear right side. The front left side range camera 11 can only produce a point cloud of the front left portion of the teddy bear, and so forth. So, the four (4) individual point clouds need to be combined to generate a point cloud of the entire teddy bear, which is what is required for 3D reconstruction. After the individual point clouds are gathered, the method proceeds to Step 32, where contour images are created.

In step 32, 2D contour images are created from the range camera images captured at step 30 on the RGB cameras 10. Much like the point clouds, each RGB camera 10 generates a contour image of a section of the scene/object 12 (e.g., front left, back right).

In step 33, all of the point clouds are combined into a single point cloud in accord with the calibration data. Specifically, the calibration process identifies (prior to the scan) the position of each of the range cameras 11 and RGB cameras 10 with respect to the scene/object 12. The system uses this position information to combine the individual point clouds generated by each range camera 11 into a single point cloud of the scene/object 12.

In step 34, a mesh reconstruction algorithm produces a geometry mesh from the resulting single point cloud using the 2D contour images as boundaries. Two important stages occur during the mesh reconstruction phase: (1) additional 3D points are obtained from the RGB camera images by analyzing them and by considering the contours of the object/scene for mesh calculations, and (2) the mesh is fit to these objects contours to correct the inaccuracies of the initial data from the range cameras 11. Range cameras are often inaccurate (i.e., noisy), and the use of the RGB camera images for contouring allows the production of a more accurate version of the 3D object/scene.

Next, texture mapping of the geometry mesh is performed in step 35. Texture mapping is based on the projection of 2D color images according to the calibration data. However, texture mapping involves more than simply projecting image shots from the RGB cameras 10 onto the polygonal mesh; additional processing is performed. Specifically, the texture mapping algorithm looks for sequences in the texture images and makes adjustments. A similar technique is described in "Seamless Montage for Textural Models," Gal et al., *Computer Graphics Forum*, Volume 0 (1981), Number 0 pp. 1-7, the contents of which are incorporated herein by reference. For example, if the algorithm knows that the 3D object/scene is a shoe, it will look for elements of shoes (e.g., seams, laces, sole, etc.) and adjust the texture mapping where such elements are identified. Once the texture mapping is completed, the method looks for the next set of range and 2D color images from the range cameras 11 and RGB cameras 10. If there is another set of images, the process begins again with step 31, and proceeds accordingly until all sets of images have been processed, at which point the process finishes. In most cases, there is only a single set of range and 2D color images, so steps 31-35 are performed only once. In cases where the 3D object/scene 12 is in motion, or where 3D video is required (as opposed to a 3D still image), the process proceeds to step 36 and back to step 31.

In a second exemplary embodiment, the present invention allows a user to utilize a single 3D camera for instant capturing of a 360-degree 3D model. Various 3D cameras may be used for this purposes, but one example is the Intel® RealSense™ 3D Camera. The calibration and capturing process proceeds much the same in the second exemplary embodiment as in the first exemplary embodiment, except that calibration is only for a single 3D camera, and images are only captured from the single 3D camera.

In a third exemplary embodiment, the present invention allows a user to utilize multiple range and Red/Green/Blue (RGB) cameras, or a single 3D camera, for instant capturing of a 360-degree 3D motion sequence (3D Video). 3D Video is simply a sequence of individual 3D models with a timestamp for each image. Again, the calibration and capturing process proceeds much the same in the third exemplary embodiment as in the first and second exemplary embodiments, except that the capturing process is repeated multiple times at selected time intervals.

Once a 3D model (3D Still or 3D Video) has been created, system may permit various additional actions. For example, scanned scenes/objects may be exported as ".OBJ" or ".STL" files. Such files can then be opened for editing in other software programs such as Autodesk® 3D Studio Max or Autodesk® Maya. Those of ordinary skill in the art will realize that many types of files can be exported based on scanned scenes/objects, and many different types of editing software may be utilized with such files.

Once created, 3D models may also be shared through various outlets, such as social media (e.g., Twitter®, Facebook®, Instagram®) and the like using the system. 3D models may be embedded into websites, online stores or just shared with friends on social networks. 3D models can be viewed on any device, and no specialized software is required for viewing.

The system may also be integrated with a 3D printing service or device, such that 3D prints of the scanned 3D models may be created on demand.

The system also includes optimized algorithms for different types of objects: furniture, clothing, shoes, etc. The system also allows the user the ability to scan people and large objects (closets, tables, etc.).

The method described above is preferably carried out by a program module running on, or accessible by, one or more computing devices. In one example, the method may be carried out by software (including the program module) running on a laptop computer which is connected to the range cameras 11 and RGB cameras 10. In another example, the method may be carried out by a server computer (including software running the program module) which is coupled to a plurality of client minicomputers, which are in turn coupled to each of the range cameras 11 and RGB cameras 10. In yet another example, the method may be carried out on tablets or mobile phones accessing the program module stored on a server computer over the Internet. In the near future, many tablets and mobile phones will include built-in 3D cameras (e.g., Intel® RealSense™ 3D Camera), which can be utilized. Even if such 3D cameras are not built into the tablets and mobile phones, users will be able to easily attach such cameras for 3D imaging purposes.

Figure 6:
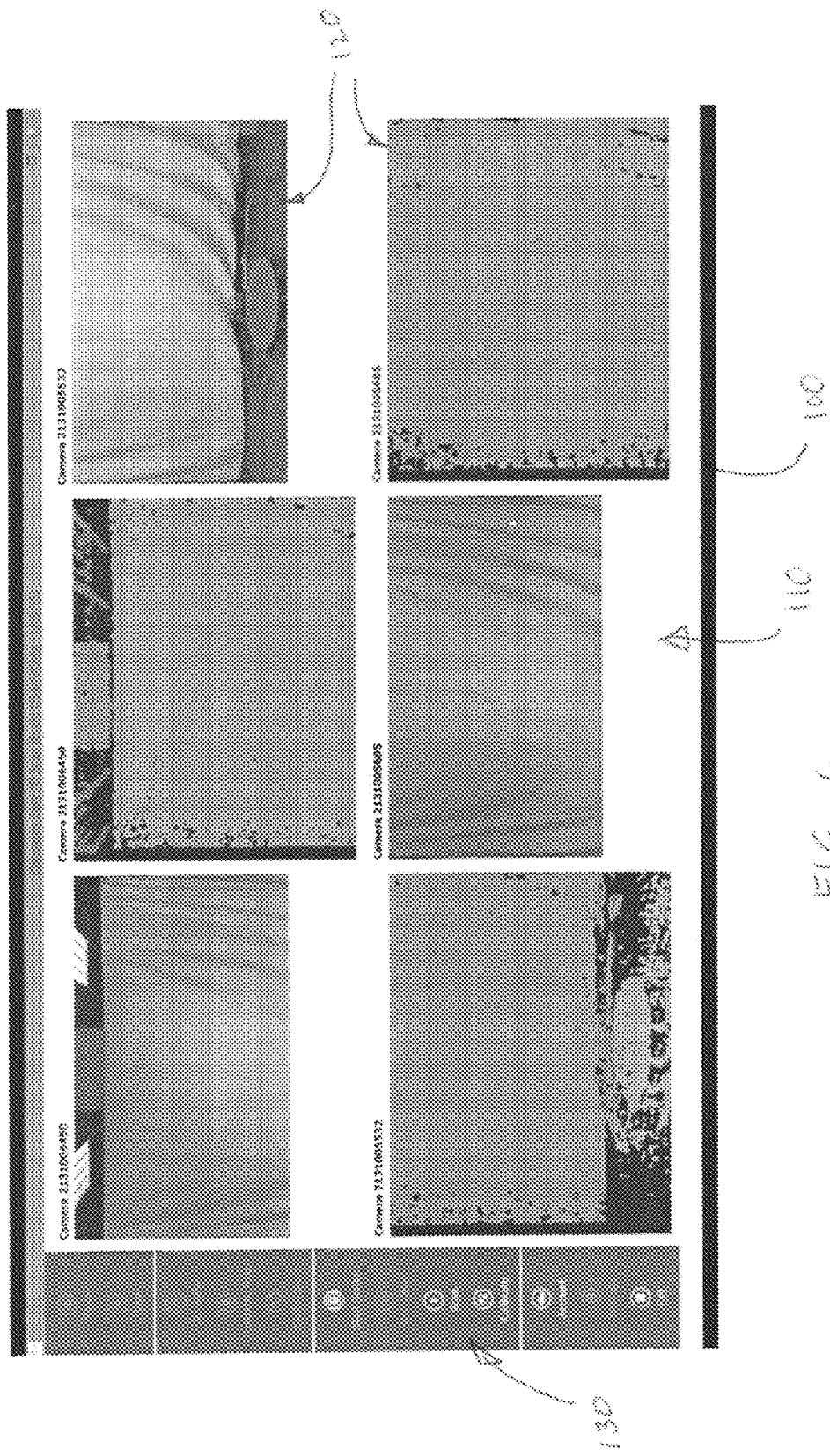
FIG. 6 illustrates an exemplary Setup Screen according to an exemplary embodiment of the present invention.

FIG. 6 illustrates an exemplary Setup Screen. The Setup Screen 100 may include a main window 110, and a plurality of camera windows 120. Those of ordinary skill in the art will realize that the specific number of camera windows 120 depends on the number of range cameras 11 and RGB cameras 10 being utilized. In the example, there are six (6) camera windows 120, corresponding to three (3) range cameras and three (3) RGB cameras shown in FIG. 5. The Setup Screen 100 may also have a menu area 130 which includes various selectable buttons for performing various functions. For example, there are "Open" and "Save" buttons for opening a new 3D scanning project and saving an existing project, respectively. There are "3D Selfie," "Turntable Scan" and "Calibration" buttons for, respectively, taking an instantaneous 3D image of a person or multiple persons, performing a 3D scan of the object/scene disposed on a rotating or stationary platform 14, or performing a system calibration. There are "Start Server" and "Start Client" buttons for, respectively, launching a computer in server mode (meaning data from other connected 'client' computers will be collected and processed in that computer) and launching a computer in client mode (meaning cameras will be connected to it, and will transmit data to it for transmission to the server computer). There are "Account," "Settings" and "Exit" buttons for accessing the user's account, personal scanning settings, and for exiting the software. Most importantly, there are "Calibrate" and "Scan" buttons for respectively calibrating the cameras, and scanning the 3D object/scene.

Figure 7:
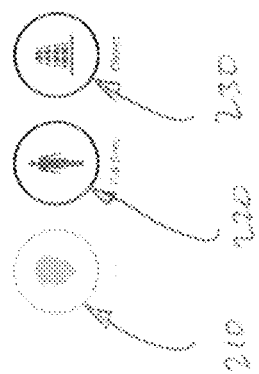
FIG. 7 illustrates an exemplary Capture Mode according to an exemplary embodiment of the present invention.

FIG. 7 illustrates an exemplary Capture Mode Screen 200. If the user selects the "Scan" button from the Setup Screen 100, the Capture Mode Screen 200 is displayed. The Capture Mode Screen 200 may include at least three (3) selectable buttons as shown, a "Head" button 210, a "Full Body" button 220 and an "Object" button 230. These buttons allow the user to select the type of 3D object being scanned. For human scans, the user would select either "Head" or "Full Body"; for everything else, the user would select "Object." However, before a scan can be performed, the cameras must be calibrated.

FIG. 8 illustrates an exemplary Calibration Screen 300. If the user selects the "Calibrate" button from the Setup Screen 100, the Calibration Screen 300 is displayed. The Calibration Screen 300 may include a main window 310, and a plurality of camera windows 320. The Calibration Screen 300 may also have a menu area 330 which includes various selectable buttons for performing various functions. For example, there are "Calibrate," "Setup Turntable" and "Back" buttons. The Calibration Screen 300 may also have a status area 340 that displays various parameters of the calibration. The "Calibrate" button starts the calibration process after the countdown time specified in the status area 340. The "Setup Turntable" button allows the user to set up a stationary or moving platform 14 in the scanning area, as shown in FIG. 4 discussed above. The "Back" button returns the user to the Capture Mode Screen 200 (FIG. 7). For example, a chessboard may be used to calibrate the cameras. The status area 340 allows the user to set the length and height of the chessboard, a countdown time, and a record time for 'base' and 'target' cameras. The 'base' and 'target' cameras are the specific range and/or RGB cameras being calibrated. Cameras are calibrated by pair, so with the example shown in FIG. 1, a first camera pair including one range camera 11 and one RGB camera 10 are calibrated, and then a second camera pair, and so on. Once a pair of cameras are selected on the Calibration Screen 300, the user selects the "Calibrate" button and places the calibration device (e.g., chessboard) in the view of the selected cameras. After the countdown time expires, the selected cameras record images for the specified recording time. Once the calibration process is completed for a first pair of cameras, the user selects a second pair of cameras and presents the calibration device (e.g., chessboard) to those cameras. This process proceeds until all cameras have been calibrated to the calibration device. Once all the cameras are calibrated, the 3D scanning process may be commenced.

Figure 9:
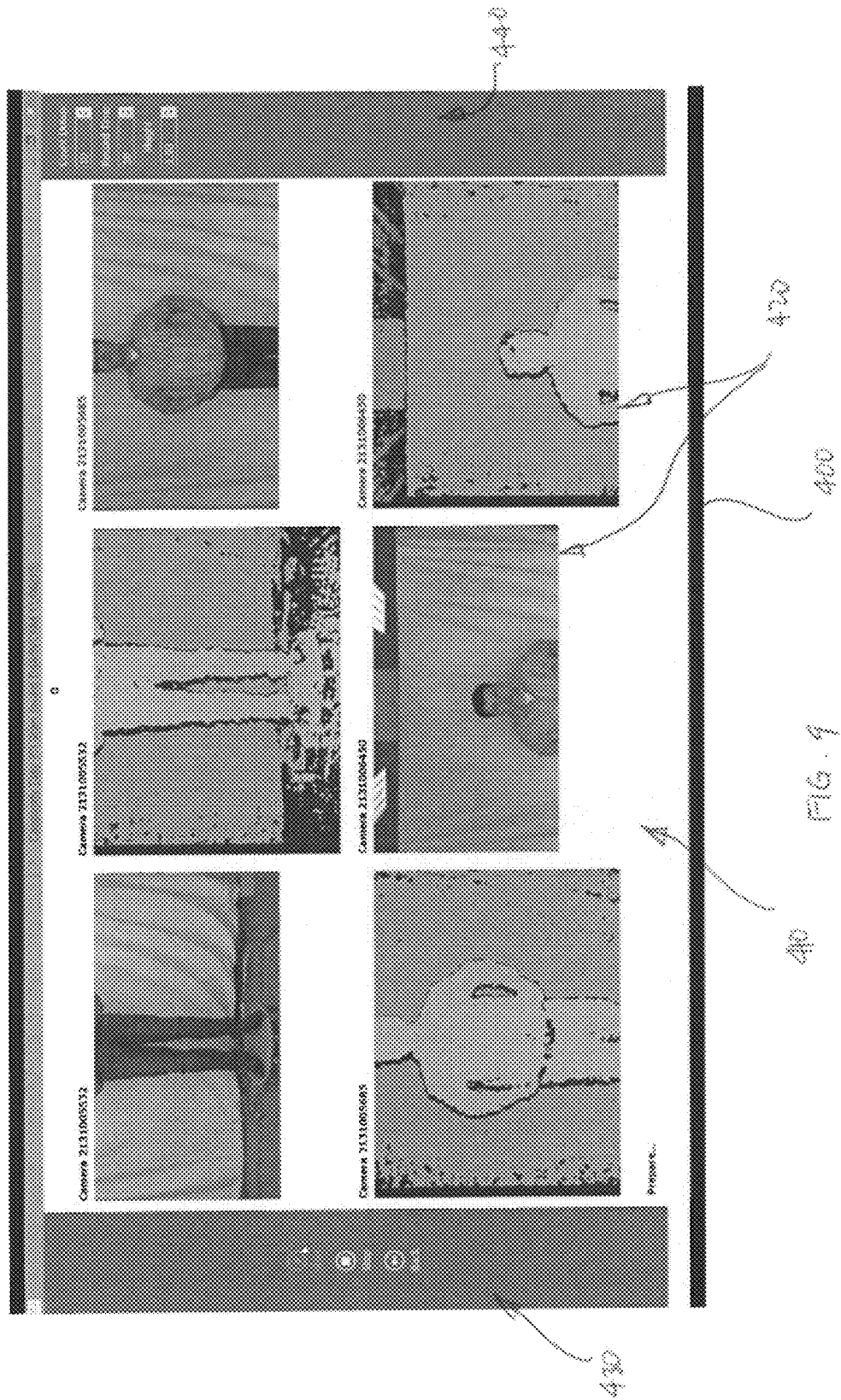
FIG. 9 illustrates an exemplary Scanning Screen according to an exemplary embodiment of the present invention.

FIG. 9 illustrates an exemplary Scanning Screen 400. If the user selects one of the "Head," "Full Body" or "Object" buttons 210, 220, 230 from the Capture Mode Screen 200, the Scanning Screen 400 is displayed. The Scanning Screen 400 may include a main window 410, and a plurality of camera windows 420. The Scanning Screen 400 may also have a menu area 430 which includes various selectable buttons for performing various functions. For example, there may be "Scan," "Stop" and "Back" buttons. The "Scan" button begins the scan process, the "Stop" button stops the process, and the "Back" button returns the user to the Capture Mode Screen 200 (FIG. 7). The Scanning Screen 400 may also have a status area 440 that displays various parameters of the scanning process. For example, the status area 440 may display a countdown time for scanning, a record time, and a height of the scanned person/object.

Figure 10:
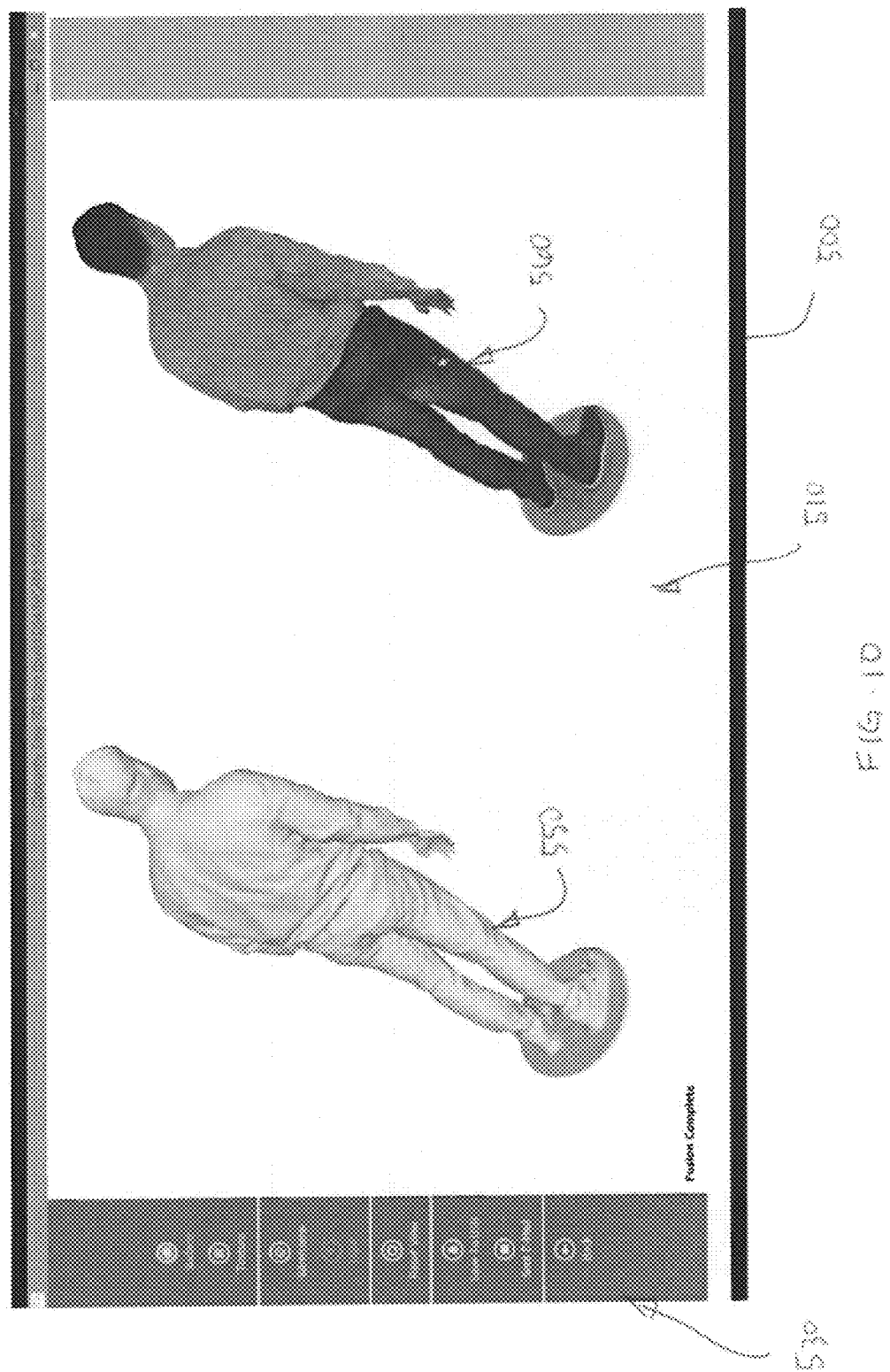
FIG. 10 illustrates an exemplary Results Screen according to an exemplary embodiment of the present invention.

FIG. 10 illustrates an exemplary Results Screen 500. Once the 3D scanning performed from the Scanning Screen 400 is complete, the Results Screen 500 is displayed. The Results Screen 500 may include a main window 510, and a menu area 530 including various selectable buttons for performing various functions. The main window 510 displays the results of the 3D scan. The results may include a geometry mesh model 550, and a texture mapped model 560. As explained above in connection with FIG. 3 (Step 34), a mesh reconstruction algorithm produces a geometry mesh from a single point cloud using 2D contour images as boundaries. After the geometry mesh is generated, texture mapping based on the projection of 2D color images according to calibration data is performed (FIG. 3, Step 35). These respective processes generate the geometry mesh model 550 and the texture mapped model 560 shown on the Results Screen 500. For example, menu area 530 may include "Surface" and "Texture" buttons for switching between surface and texture representations of the 3D object/scene. The menu area 530 may also include "Wireframe" and "Light" buttons for, respectively, showing the polygonal mesh (wireframe) of the 3D object/scene, and activating or deactivating a light source in the 3D model (which helps in finding potential issues with the polygonal mesh by casting shadows). The menu area 530 may include a "Reset View" button for resetting all parameters to their default setting. The menu area 530 may additional include "Save To USB" and "Send E-Mail" buttons for saving a 3D scan to a USB drive, or sending it to others via e-mail, respectively. Finally, the menu area 530 may include a "Back" button for returning to the Scanning Screen 400 (FIG. 9).

As discussed above, the present invention may be carried out by camera devices which are coupled to computing devices to form a network. This network may be coupled to an online environment, such as the World Wide Web or the Internet. In this regard, client devices, illustrated in the exemplary form of a desktop computer system, laptop, smart phone, etc., provide a means for a user to access an online environment and thereby gain access to content, such as media, data, webpages, catalogs, and games associated with the online environment. Since the manner by which the client devices are used to access the online environment are all well known in the art, they will not be discussed herein for the sake of brevity.

As will be further appreciated by those of skill in the art, the computing devices, as well as the computing devices within the online environment, will include computer executable instructions stored on computer-readable media such as hard drives, magnetic cassettes, flash memory cards, digital videodisks, Denoulli cartridges, nano-drives, memory sticks, and or read/write and/or read only memories. These executable instructions will typically reside in program modules which may include routines, programs, objects, components, data structures, etc., that perform particular tasks or implement particular abstract data types. Accordingly those skilled in the art will appreciate the computing devices may be embodied in any device having the ability to execute instructions such as, by way of example, a personal computer, mainframe computer, personal-digital assistant ("PDA"), cellular telephone, smart phone, gaming system, personal appliance, etc. Furthermore, those of skill in the art will appreciate that the various tasks described hereinafter may be practiced in a distributed environment having multiple processing devices linked via a local or wide-area network (LAN or WAN) whereby the executable instructions may be associated with and/or executed by one or more of multiple processing devices.

The exemplary computer system may also provide logical connections to one or more third party computing devices, such as third party content servers which may include many or all of the elements described above relative to a computing device. Communications between the client devices, the online environment, and third party computing devices may b exchanged via a further processing device, such as a network router that is responsible for network routine.

In view of the foregoing detailed description of exemplary embodiments of the present invention, it readily will be understood by those persons skilled in the art that the present invention is susceptible to broad utility and application. While various aspects have been described in the context of standalone application, the aspects may be useful in other contexts as well. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a exemplary sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to exemplary embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

What is claimed is:

1. A computer system comprising:
   at least one server computer; and,
   at least one client computer coupled to the at least one server computer through a network;
   a plurality of range cameras, each coupled to the at least one client computer;
   a plurality of RGB cameras each coupled to the at least one client computer;
   wherein the at least one server computer includes at least one program stored thereon, said at least one program being capable of performing the following steps:
      intrinsically calibrating each of the plurality of range cameras with respect to a calibration object prior to capturing a first set of 2D images;
      extrinsically calibrating each of the plurality of range cameras prior to capturing the first set of 2D images by determining the relative position of a first one of the plurality of range cameras with respect to a second one of the plurality of range cameras;
      extrinsically calibrating each of the plurality of RGB cameras by determining the relative position of a first one of the plurality of range cameras with respect to a first one of the plurality of RGB cameras;
      determining the coordinates of a three-dimensional (3D) object through the extrinsic calibrations of the range and RGB cameras;
      capturing a first set of two-dimensional (2D) images of the 3D object using the plurality of range cameras;
      generating a point cloud from the first set of 2D images; and,
      generating a 3D reconstruction of the 3D object using the first set of 2D images.

2. The computer system of claim 1, wherein said at least one program is capable of performing the further steps of:
   capturing a second set of 2D images of the 3D object using the plurality of RGB cameras; and performing texture mapping of the 3D reconstruction using the second set of 2D images.

3. The computer system of claim 1, wherein said at least one program is capable of performing the further steps of:
calibrating each of the plurality of RGB cameras with respect to a calibration object prior to capturing the second set of 2D images.

4. The computer system of claim 1, wherein said step of capturing a first set of 2D images using the plurality of range cameras comprises:
capturing a first 2D image from a first range camera of the plurality of range cameras which is positioned at a first position with respect to the scene or object;
capturing a second 2D image from a second range camera of the plurality of range cameras which is positioned at a second position with respect to the scene or object.

5. The computer system of claim 1, wherein said step of capturing a first set of 2D images using the plurality of range cameras comprises:
capturing a first 2D image from a first range camera of the plurality of range cameras which is positioned at a first position in front of the scene or object;
capturing a second 2D image from a second range camera of the plurality of range cameras which is positioned at a second position in front of the scene or object;
capturing a third 2D image from a third range camera of the plurality of range cameras which is positioned at a third position behind the scene or object; and
capturing a fourth 2D image from a fourth range camera of the plurality of range cameras which is positioned at a fourth position behind the scene or object,
wherein each of the first, second, third and fourth range cameras capture a different portion of the scene or object.

6. The computer system of claim 5, wherein said step of generating a point cloud from the first set of 2D images comprises:
combining the first, second, third and fourth images captured by the first, second, third and fourth range cameras of different portions of the scene or object to create a single point cloud of the entire scene or object.

7. The computer system of claim 2, wherein said step of capturing a second set of 2D images using the plurality of RGB cameras comprises:
capturing a first 2D image from a first RGB camera of the plurality of RGB cameras which is positioned at a first position with respect to the scene or object;
capturing a second 2D image from a second RGB camera of the plurality of RGB cameras which is positioned at a second position with respect to the scene or object.

8. The computer system of claim 2, wherein said step of capturing a second set of 2D images using the plurality of RGB cameras comprises:
capturing a first 2D image from a first RGB camera of the plurality of RGB cameras which is positioned at a first position in front of the scene or object;
capturing a second 2D image from a second RGB camera of the plurality of RGB cameras which is positioned at a second position in front of the scene or object;
capturing a third 2D image from a third RGB camera of the plurality of RGB cameras which is positioned at a third position behind the scene or object; and
capturing a fourth 2D image from a fourth RGB camera of the plurality of RGB cameras which is positioned at a fourth position behind the scene or object,
wherein each of the first, second, third and fourth RGB cameras capture a different portion of the scene or object.

9. The computer system of claim 5, wherein said step of capturing a first set of 2D images using the plurality of range cameras further comprises:
capturing a fifth 2D image from a fifth range camera of the plurality of range cameras which is positioned at a fifth position above the scene or object.

10. A non-transitory computer readable medium having embodied therein a computer program for processing by a machine, the computer program comprising:
a first code segment for intrinsically calibrating each of the plurality of range cameras with respect to a calibration object, for extrinsically calibrating each of the plurality of range cameras by determining the relative position of a first one of the plurality of range cameras with respect to a second one of the plurality of range cameras, and for extrinsically calibrating each of a plurality of RGB cameras by determining the relative position of a first one of the plurality of range cameras with respect to a first one of the plurality of RGB cameras, prior to capturing a first set of two-dimensional (2D) images of a three-dimensional (3D) object using the plurality of range cameras;
a second code segment for generating a point cloud from the first set of 2D images; and,
a third code segment for generating a 3D reconstruction of the 3D object using the first set of 2D images.

11. The non-transitory computer readable medium of claim 10, wherein the computer program further comprises:
a fourth code segment for capturing a second set of 2D images of the 3D object using the plurality of RGB cameras;
a fifth code segment for performing texture mapping of the 3D reconstruction using the second set of 2D images.

12. The non-transitory computer readable medium of claim 11, wherein the computer program further comprises:
a sixth code segment for calibrating each of the plurality of RGB cameras with respect to a calibration object prior to capturing the second set of 2D images.

13. A computer-implemented method for three-dimensional (3D) reconstruction of an object or scene, the method comprising the steps of:
(a) calibrating each of a plurality of range cameras with respect to a calibration object prior to capturing a first set of 2D images, said calibrating step involving an intrinsic calibration of each of the plurality of range cameras with respect to a calibration object, an extrinsic calibration of each of the plurality of range cameras by determining the relative position of a first one of the plurality of range cameras with respect to a second one of the plurality of range cameras, and an extrinsic calibration of each of the plurality of RGB cameras by determining the relative position of a first one of the plurality of range cameras with respect to a first one of the plurality of RGB cameras;
(b) imaging the object or scene with the plurality of range cameras and producing at least one first image set;
(c) generating a point cloud using the at least one first image set;
(d) generating a 3D reconstruction of the object or scene using the point cloud; and,
(e) displaying said 3D reconstruction of the object or scene.

14. The computer-implemented method of claim 13, comprising the further steps of:
(f) capturing a second set of 2D images of the 3D object using the plurality of RGB cameras; and
(g) performing texture mapping of the 3D reconstruction using the second set of 2D images.

15. The computer-implemented method of claim 13, comprising the further steps of:
calibrating each of the plurality of RGB cameras with respect to a calibration object prior to capturing the second set of 2D images.

16. A system for three-dimensional (3D) reconstruction of an object or scene, the system comprising:
a plurality of range cameras for imaging the object or scene;
a plurality of RGB cameras for imaging the object or scene; and,
a controller comprising a first program module for generating at least one first image set from the plurality of range cameras, a second program module for generating at least one second image set from the plurality of RGB cameras, a third program module for generating a point cloud from the at least one first image set, a fourth program module for generating a 3D mesh reconstruction of the scene or object from the point cloud, and a fifth program module for performing texture mapping of the mesh reconstruction,
wherein the plurality of range cameras and plurality of RGB cameras are disposed at different positions with respect to the object or scene, such that each range or RGB camera captures a different perspective of the object or scene and wherein such different perspectives are combined when generating the point cloud so as to completely reconstruct the 3D scene or object,
wherein the plurality of range cameras and the plurality of RGB cameras are calibrated prior to generating the at least one first and at least one second image sets, said calibration comprising an intrinsic calibration of each of the plurality of range cameras with respect to a calibration object, an extrinsic calibration of each of the plurality of range cameras by determining the relative position of a first one of the plurality of range cameras with respect to a second one of the plurality of range cameras, and an extrinsic calibration of each of the plurality of RGB cameras by determining the relative position of a first one of the plurality of range cameras with respect to a first one of the plurality of RGB cameras.

* * * * *